(12) United States Patent
Bruno et al.

(10) Patent No.: US 12,321,761 B2
(45) Date of Patent: Jun. 3, 2025

(54) HUB FOR MICRO FRONT-END SERVICES

(71) Applicant: Wells Fargo Bank, N.A., San Francisco, CA (US)

(72) Inventors: John Bruno, Scottsdale, AZ (US); Sean Edward Falese, Jenkintown, PA (US); Arnaud Versini, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 18/333,222

(22) Filed: Jun. 12, 2023

(65) Prior Publication Data

US 2024/0411569 A1    Dec. 12, 2024

(51) Int. Cl.
*G06F 9/451* (2018.01)
*G06F 16/957* (2019.01)
*G06F 16/958* (2019.01)

(52) U.S. Cl.
CPC .......... *G06F 9/451* (2018.02); *G06F 16/9577* (2019.01); *G06F 16/958* (2019.01)

(58) Field of Classification Search
CPC ..... G06F 9/451; G06F 16/958; G06F 16/9577
See application file for complete search history.

(56) References Cited

U.S. PATENT DOCUMENTS

| | | | | |
|---|---|---|---|---|
| 7,761,794 B1 * | 7/2010 | Chari | ...................... | G06Q 10/06 715/700 |
| 9,104,392 B1 * | 8/2015 | Dunagan | ........... | G06F 16/24575 |
| 10,439,898 B2 * | 10/2019 | Ranjekar | ............. | H04L 41/5009 |
| 10,983,782 B1 * | 4/2021 | Mitra | ........................ | G06F 8/65 |
| 12,001,653 B1 * | 6/2024 | Graham | ................ | G06Q 20/102 |
| 2002/0196277 A1 * | 12/2002 | Bushey | ....................... | G06F 8/20 715/745 |
| 2009/0150536 A1 * | 6/2009 | Wolman | ................... | H04L 69/40 709/224 |
| 2013/0207988 A1 * | 8/2013 | Artigue | .................... | G06F 9/451 345/589 |
| 2016/0034258 A1 * | 2/2016 | Wijngaard | ................ | G06F 8/73 717/123 |
| 2016/0283833 A1 * | 9/2016 | Peek | ..................... | G06K 15/021 |
| 2016/0350197 A1 * | 12/2016 | Amichai | ............... | G06F 11/302 |
| 2017/0024308 A1 * | 1/2017 | Knoulich | ............ | G06F 11/3664 |
| 2019/0057111 A1 * | 2/2019 | Chung | .................. | G06F 16/252 |
| 2021/0192106 A1 * | 6/2021 | Bourhani | ................ | G06F 30/20 |
| 2021/0248205 A1 * | 8/2021 | Tank | ..................... | G06F 16/986 |
| 2022/0283805 A1 * | 9/2022 | Dasa | ................... | H04L 67/1097 |
| 2022/0300524 A1 * | 9/2022 | Banerjee | ............... | G06F 16/958 |

(Continued)

OTHER PUBLICATIONS

U.S. Appl. No. 17/663,572, filed May 16, 2022.
U.S. Appl. No. 17/658,015, filed Apr. 5, 2022.
U.S. Appl. No. 18/174,054, filed Feb. 24, 2023.

*Primary Examiner* — Chau T Nguyen
(74) *Attorney, Agent, or Firm* — Merchant & Gould P.C.

(57) ABSTRACT

An example hub and registry module can be programmed to determine if a plurality of micro front-ends is conformant with one or more experience rules, register one or more of the plurality of micro front-ends in response to determining that the one or more micro front-ends are conformant with the one or more experience rules, compose one or more micro front-ends into an experience for a user, and monitor performance of the one or more micro front-ends within the experience.

17 Claims, 10 Drawing Sheets

(56) References Cited

U.S. PATENT DOCUMENTS

| | | | | |
|---|---|---|---|---|
| 2023/0036980 A1* | 2/2023 | Chen | ............ | G06F 9/505 |
| 2023/0110520 A1* | 4/2023 | Ding | ............ | G06F 9/451 |
| | | | | 717/121 |
| 2023/0251835 A1* | 8/2023 | Manohar | ............ | G06F 8/36 |
| | | | | 717/107 |
| 2023/0368288 A1* | 11/2023 | Bruno | ............ | G06Q 40/02 |
| 2024/0103939 A1* | 3/2024 | Singh | ............ | G06F 9/542 |
| 2024/0119154 A1* | 4/2024 | Hoffman | ............ | G06F 21/57 |

* cited by examiner

FIG. 5

| Compliance Checks 502 | |
|---|---|
| Description 506 | Status 504 |
| Separate JS, CSS | Compliant |
| Modular Based Design | Compliant |
| Code Content Separation | Compliant |
| Caching of static assets | Verifying... |
| Modular Based Design | Verifying... |
| Responsive Design | Verifying... |
| Unit Tests | Verifying... |
| Listing all the JS code | Verifying... |
| Usage of pre-processor | Verifying... |

Tools & Support
- Do you have any question Contact us
- Help & FAQs
- Contribute to community
- MFE Market Place
- FED Scorecard Resources
- Tutorial
- Documentation
- Change Log Sign-up for developer updates
Enter your Email ID
You can unsubscribe at any time.
Subscribe

Cash Accounts 612 614

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat.

650

Demo 654

Alpha Account CAP Senior Beta Gamma London Account
4567-12-5493
109,000.00 USD

Recent Transactions

| Date | Recipient | Type | Account |
|---|---|---|---|
| 06/03/2022 | Alpha beta bank | ACH | 48078.75 USD |
| 06/03/2022 | Gamma delta bank | Debit | 3982.2 USD |
| 06/04/2022 | Alpha beta LLC | Wire | 986.25 USD |
| 06/04/2022 | Sigma omega Extended Retirement | RTP | 76028.75 USD |

Details 658

Description
Lorem Ipsum dolor sit amet, consectetur adipiscing elit

MFE Owner
AppOne ID: 8384783
GITS ID : 73832920

660

Status
● ○ ○ ○ ○
Submitted Validating Registered Deploying Active

Specifications 656

Design Specifications
Link to the file

Design system
Pioneer v 4.0.1

Domain API
Commercial Accounts Graph, Commercial Accounts Transaction Graph

BBPA Alignment
Global Treasury Management > Commercial Accounts

Design Specs
Lorem Ipsum

Tech Specs
Dependencies, WFRIA version, Package definitions

Configurations 662

Views
Default

Custom Properties
Nil

Required Properties
user (shape), mfeEntitlements (shape)

Usage & Analytics 664

Performance
83% Compatible with the specs and load time is increased

Controller
Accounts, Lending Dashboard

HUB FOR MICRO FRONT-END SERVICES

BACKGROUND

Users access many different types of sites to interact with businesses. These sites are programmed to provide information and desired functionality to the users. However, these sites can be difficult to create, particularly when different users have different needs and priorities. This can result in sites that may not be optimized for all users.

SUMMARY

Embodiments are directed to a system including at least one processor and non-transitory computer-readable storage storing instructions that, when executed by the at least one processor, cause the system to generate a hub and registry module programmed to: determine a plurality of micro front-ends are conformant with one or more experience rules; register one or more of the plurality of micro front-ends in response to determining each of the one or more micro front-ends are conformant with the one or more experience rules; compose one or more micro front-ends into an experience for a user; and monitor performance of the one or more micro front-ends within the experience.

According to aspects of the present disclosure, the hub and registry module is further programmed to: determine a new version of a micro front-end of the plurality of micro front-ends is conformant with the one or more experience rules; store the new version of the micro front-end; replace a prior version of the micro front-end in the experience with the new version of the micro front-end; determine a change in the experience results in the new version of the micro front-end being incompatible with the experience; and revert the new version of the micro front-end to the prior version of the micro front-end.

According to other aspects of the present disclosure, the one or more experience rules are defined using a domain specific language. In some aspects, the domain specific language is JavaScript Object Notation.

According to aspects of the present disclosure, the hub and registry module is further programmed to generate a user interface on a display. According to other aspects of the present disclosure, the user interface includes, for a given micro front-end, one or more of a current version, a version history, a deployment status, an availability status, and a conformance status. According to further aspects of the present disclosure, the conformance status indicates one of a conformant status or a nonconformant status. According to other further aspects of the present disclosure, the conformance status comprises depicting a location on a scale from a conformant status to a nonconformant status. According to yet other further aspects of the present disclosure, the conformance status comprises a report summarizing conformance and nonconformance with each of the one or more experience rules.

According to other aspects of the present disclosure, the user interface comprises a dependency graph.

Other embodiments are directed to a method for managing a contextual micro front-end experience, the method includes receiving a micro front-end; determining the micro front-end conforms with one or more experience rules; registering the micro front-end; storing the micro front-end; deploying the micro front-end in response to a request to compose a contextual user experience; and monitoring performance of the micro front-end within the contextual user experience.

According to aspects of the present disclosure, the method further includes determining a new version of a micro front-end of the plurality of micro front-ends is conformant with the one or more experience rules. According to further aspects of the present disclosure, the method further includes storing the new version of the micro front-end. According to still further aspects of the present disclosure, the method further includes replacing a prior version of the micro front-end with the new version of the micro front-end. According to yet further aspects of the present disclosure, the method further includes maintaining a prior version of the micro front-end along with the new version of the micro front-end. According to other further aspects of the present disclosure, the method further includes replacing a prior version of the micro front-end in the experience with the new version of the micro front-end.

According to other aspects of the present disclosure, the method further includes making a determination the new version of the micro front-end is incompatible with the experience. According to further aspects of the present disclosure, the method further includes generating a report summarizing the determination the new version of the micro front-end is incompatible with the experience. According to still further aspects of the present disclosure, the method further includes determining a change in the experience results in the new version of the micro front-end being incompatible with the experience. According to yet further aspects of the present disclosure, the method further includes reverting the new version of the micro front-end to the prior version of the micro front-end.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows an example user interface depicting conformance checks performed by the micro front-end hub of FIG. 1.

FIG. 9 shows an example user interface depicting a report of a report on a micro front-end as generated by the micro front-end hub of FIG. 1.

DETAILED DESCRIPTION

Figure 1:
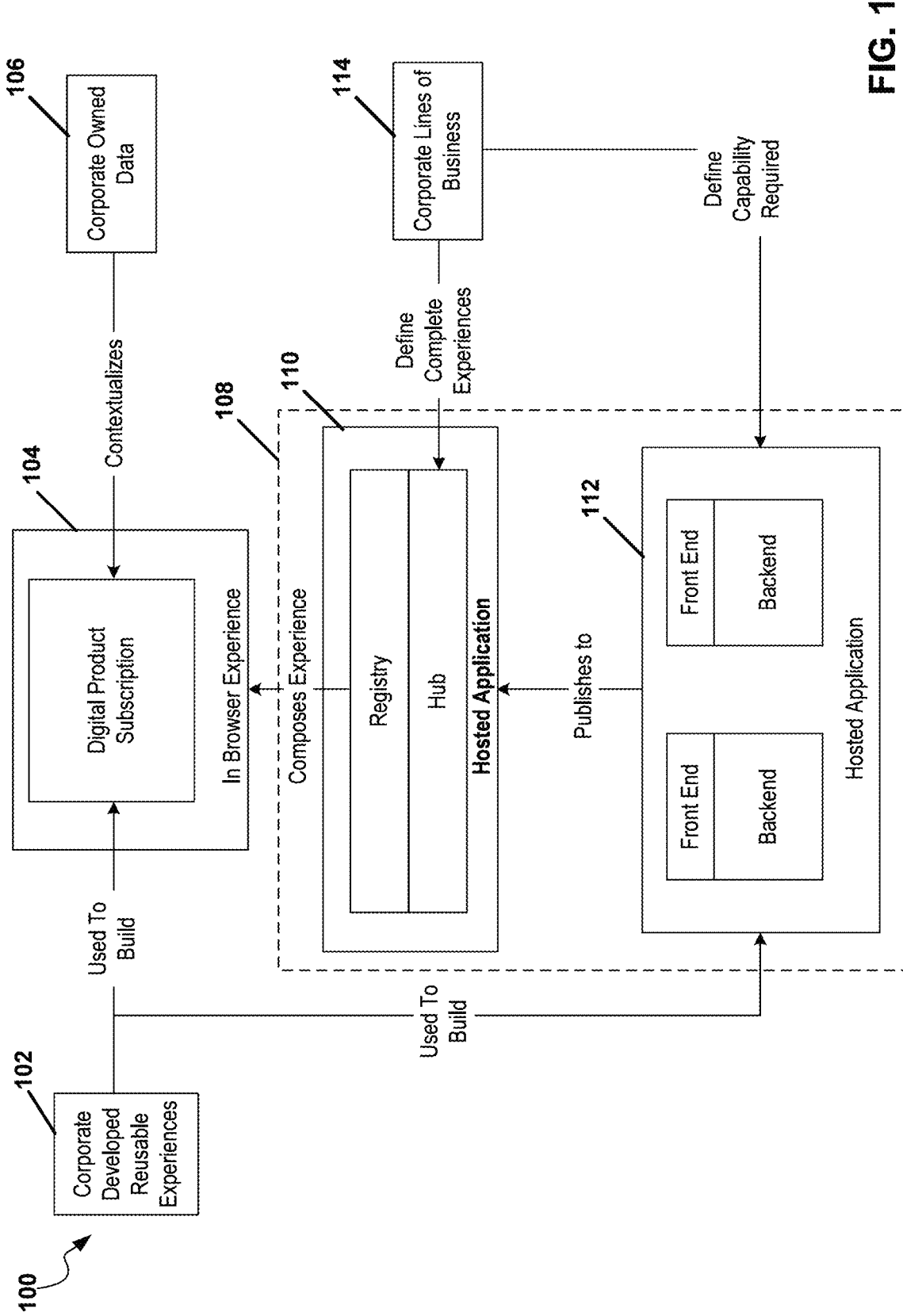
FIG. 1 shows an example system programmed to generate contextual interfaces from a micro front-end hub using micro front-end components.

Embodiments are directed to producing a contextual micro front-end experience. In particular, embodiments of the present disclosure relate to a hub (sometimes referred to as a control center) for maintaining and deploying micro front-ends into a contextual experience. In some contexts, the hub may be referred to as a marketplace.

Enterprises with legacy monolithic applications can benefit from an approach that easily allows them to develop and publish related "micro front-ends". Technology teams across the enterprise can develop reusable "micro front-end" components for other teams to consume in building their modern applications. Each team would develop in an efficient agile manner while reducing dependencies and risk to delivering value to customers.

In examples provided herein, applications with contextual interfaces can be composed of conforming micro front-end components that are available on a hub. Tools may be leveraged to help generate conforming micro front-ends for efficient development and consistency in desired behavior. In some examples, the hub provides both storage and conformance guiderails for the micro front-ends. The hub may be responsively integrated with contextual features and automatically adjust types, features, and version of deployed micro front-ends.

Examples provided herein relate to simplifying the development of web and mobile user experiences. The examples can standardize user experience layers and Application Programming Interface (API) integrations to provide personalized contextual interfaces for a user. The principles of the present disclosure may be implemented across various known and future experiences, including existing operating systems and applications with embedded micro front-ends. In some examples, these contextual interfaces can be composed of smaller micro front-end components that behave and can be released independently while conforming to specified control structures and standards. In some examples, conforming micro front-end components can be offered on a hub for consumption. Micro front-end components can appear on a user interface in a variety of forms depending on the desired contextual interface. The appearance of one or more deployed micro front-ends may be automatically adjusted by the hub or manually manipulated from a user interface.

In some examples, data known about users is leveraged to further enhance the personalized nature of the contextual interfaces. This can include composition of an aggregate digital interface through an easily consumable hub organized by common attributes and enabled for personalization. The hub may be responsively integrated with contextual features and deploy one or more micro front-ends to be accessible to a user based on particular contextual features.

In some examples, the contextual interfaces are provided in the financial services industry, although the interfaces can be equally applicable in other contexts.

Additional details regarding an example system including such micro front-ends are provided in U.S. patent application Ser. No. 17/663,572 filed on May 16, 2022, the entirety of which is hereby incorporated by reference.

In some embodiments, the hub includes registry capabilities. In example, the hub provides conformance criteria ensuring stored and/or registered micro front-ends comply with appropriate requirements. Ensuring conformance among registered micro front-ends may ensure coordination among various micro front-ends from multiple authors while providing a seamless contextual experience for a user.

The hub may actively engage with the user's contextual experience during runtime of the contextual experience. In examples, the hub engages to monitor and manage the ecosystem of micro front-ends deployed for a particular user. Coordination and monitoring of deployed micro front-ends by a centralized hub provides a more agile system and supports democratization of micro front-end development. Complexities of coordination are overcome by the hub enforcing conformance criteria on the micro front-ends.

In embodiments, the hub provides an active control center to monitor and adjust micro front-end deployment. For example, redundancies are distilled by providing a centralized control center to maintain the registry of micro front-ends and coordinate their deployment so that the storage or registry does not become cluttered with multiple redundant micro front-ends.

In some examples, the hub may operate using a domain specific language to define a set of rules. The domain specific language and/or the rules may be configured to ensure that only micro front-ends meeting conformance requirements can be registered and/or deployed by the hub.

In some examples, the hub may operate using a domain specific language and associated meta data to define a set of rules. In some embodiments, the domain specific language describes the micro front-end to the ecosystem such that the micro front-end can be accepted by the hub and integrated within experiences.

For instance, the domain specific language can provide the framework that is used to define how to render the micro front-end. Metadata can also be associated with the micro front-end to define how the micro front-end is configured to interface with the framework. Conformance of the micro front-end is derived from the metadata associated with the micro front-end's runtime characteristics. The metadate can be used to ensure that only micro front-ends meeting conformance requirements can be registered and/or deployed by the hub.

In some examples, the hub provides a user interface enabling visualization and control of micro front-ends present in the register or storage. Micro front-ends may be presented in the user interface in a current or a target state, or a user may select which state to view.

The centralized hub, with conformance and deployment capabilities, provides for component integration. For example, application programming interfaces (APIs) may integrate or interface with the hub to distribute hosted micro front-ends across a plurality of applications. Micro front-ends registered and maintained by the hub can be consumed by a variety of different applications. This allows sharing of micro front-ends and their functionality across a multitude of applications. For example, a particular user may prefer a particular functionality to be a part of their user experience with all the applications they engage with, which can then be provided by a shared micro front-end via the hub and the contextual experience.

The hub provides coordination among micro front-ends which by be interdependent. For example, the hub may ensure micro front-ends which rely on one another to operate are deployed together. In some examples, the hub monitors operation and interaction among registered and deployed micro front-ends.

The hub may provide centralized control of deployment and versioning of registered micro front-ends. For example, the hub may recall or otherwise deactivate version of micro front-ends which are no longer supported. The hub may revert a micro front-end to an earlier version if an issue emerges with a current or newer version.

The examples provided herein provide a practical application of the described technologies. Micro front-ends provide variety within the front-end of a user experience to allow for customization and contextualization of the experience for each user. However, the selection, deployment, and coordination of the various micro front-ends within a system raise issues of maintenance and coordination that may call for additional infrastructure within the system to solve.

Deployment and integration of micro front-ends is improved and, in some cases, may be optimized by the hub described herein. By providing a centralized base of experience for the user engaging in the micro front-ends, the micro front-ends can be maintained according to a common conformance criteria and relevant contextual information to allow for deployment uniformly from a common hub.

Integration of registry capabilities within the central hub aligns conformance, registry, storage, and deployment for coordinated system management and a seamless user experience for a plurality of users from a common base of experience. This allows up to the minute incremental delivery of an adaptive contextual experience to a user. In some examples, the adaptive contextual experience is generated by an artificial intelligence or machine learning system. Criteria considered by the system and reflected in the generated experience may include a micro front-end's or a user's role, a channel, a risk rating, user preferences, historical behavior by a user or a micro front-end, etc.

The centralized hub and its associated functions may eliminate downtime and support effective reuse of micro front-ends across a variety of experiences within the user's contextual experience, such as those related enterprise applications or externally embedded partner experiences.

Incorporating a user interface with the hub makes available micro front-ends visible, and may include current and target states. In some embodiments, credentialed administrators also control and manage the micro front-end ecosystem from the hub user interface. For example, a credentialed administrator may downgrade, upgrade, or take out of service a particular version of micro front-end, may monitor usage of micro front-ends, restrict usage of one or more micro front-ends, update rules and metadata for micro front-ends, etc. In summary, the hub, and by extension the hub user interface, may function as a control center of the entire micro front-end ecosystem.

The hub may incorporate API's and other components to support integration and consumption of stored micro front-ends by a variety of applications. Many other advantages are possible.

FIG. 1 shows an example system 100 programmed to generate contextual interfaces from a micro front-end hub using micro front-end components.

The system 100 generally includes a client device 104 and a server device 108. The components of the system 100 can include one or more computing devices, such as laptops, desktops, tablets, servers, server farms, etc. Each of the computing devices includes one or more storage media encoding instructions which, when executed by one or more processors, implement the functionality described herein.

Although multiple computing devices are shown in the system 100, the functionality described herein can be implemented on one or many computing devices. In such examples, each of the computing devices communicate with the others through a network. The network can be any suitable data network, such as the internet, a wide area network, a local area network, a wired network, a wireless network, a cellular network, a satellite network, a near field communication network, or any operatively connected combination of these.

In the example shown, the client device 104 can include a plurality of devices that numbers in the hundreds or thousands. The client device 104 is programmed to provide a contextual interface for a user of the client device 104.

The server device 108 can also include a plurality of devices, such as a server farm and/or cloud computing infrastructure. In this example, the example server device 108 includes a hub device 110 and a component authoring device 112. Again, each of these devices can be implemented as a single device (e.g., all within the server device 108) and/or as multiple discrete devices within the system 100.

Generally, the example component authoring device 112 is programmed to create micro front-end components. The example hub device 110 is programmed to allow those micro front-end components to be registered and stored. The hub device 110 is also used to generate contextual interfaces at the client device 104 by orchestrating one or more micro front-ends to make up the contextual interface.

More specifically, the example hub device 110 is programmed to house a plurality of micro front-end components that can be used to generate a contextual interface for a user. In these examples, the micro front-end components can be combined and reused to generate the interfaces. In some examples, the hub device 110 defines conformance criteria that dictates various aspects of the micro front-end components that are allowed to be registered at the hub device 110. The hub device 110 operates to provide a control center for maintenance and deployment of micro front-end components authored from the component authoring device 112 and implemented on the client device 104.

The component authoring device 112 is programmed to facilitate the authoring of these micro front-end components. This can include providing tools that facilitate the development of the micro front-end components. The tools can assist in assuring that the micro front-end components meet the conformance criteria necessary for the micro front-end components to be registered by the hub device 110. For example, in conjunction with the hub user interface associated with the hub device 110, discussed in more detail below in relation to FIGS. 5-7, micro front-ends failing to meet conformance criteria can be modified using tools associated with the component authoring device 112 to comply with the conformance criteria.

Each micro front-end authored using the component authoring device 112 can be received by the hub device 110 for registry, storage, and deployment. Each micro front-end may function as a stand alone component and, in some examples, may be viewed as self-contained mini-applications. The hub device 110 may store a registered collection of micro front-ends found to conform to a defined framework. The framework may be defined, for example, using a domain specific language and associated with the hub device 110. The framework and/or domain specific language may be used to establish and enforce the conformance criteria. The micro front-ends stored in the hub device 110 may be hosted and, in some examples, published for consumption by user facing applications and other experiences. More details are provided below.

Figure 2:
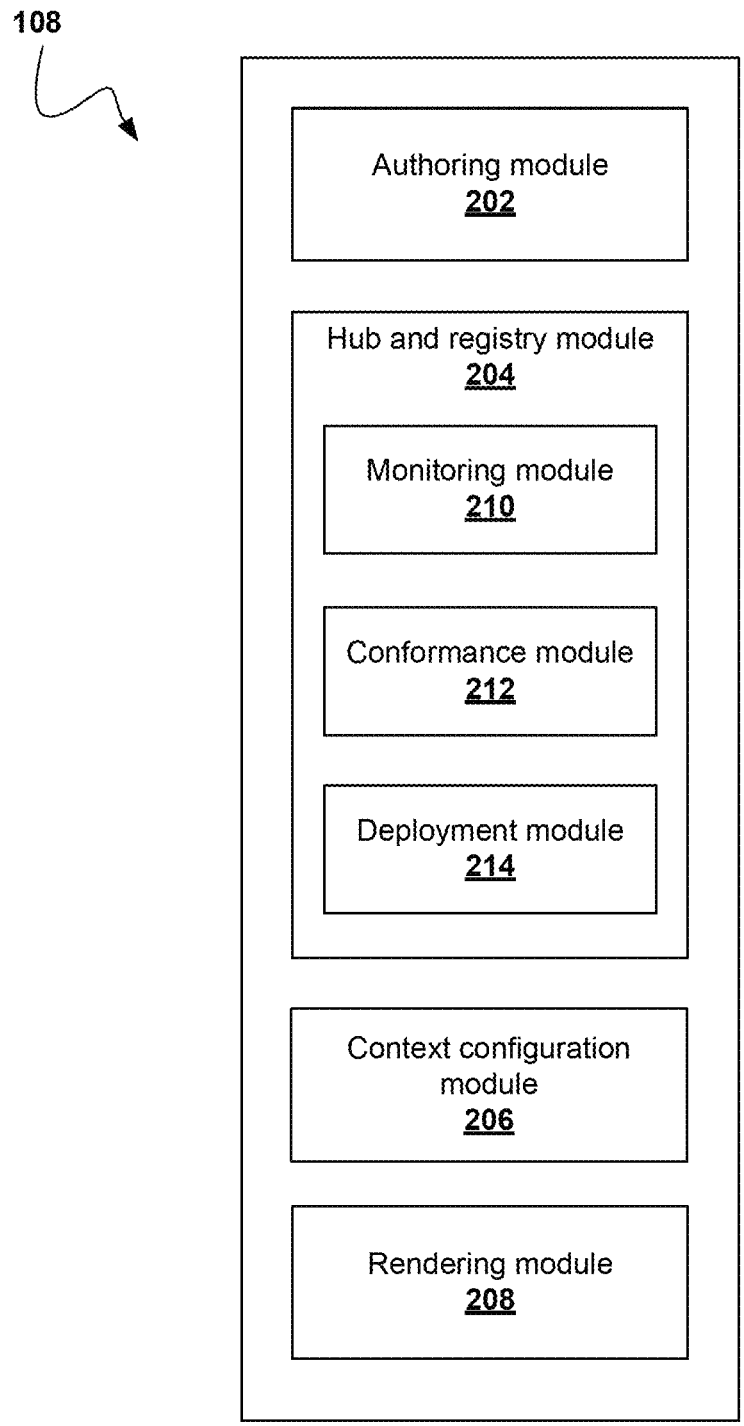
FIG. 2 shows example logical components of an example server device of the system of FIG. 1.

Referring now to FIG. 2, additional details about the server device 108 are shown. In this example, the server device 108 includes an authoring module 202, a hub and registry module 204, a context configuration module 206, and a rendering module 208. The hub and registry module 204 may include a monitoring module 210, a conformance module 212, and a deployment module 214. Many other configurations are possible.

The example authoring module 202 is generally programmed to facilitate the creation of micro front-end components. As noted, the authoring module 202 can be accessible to developers, such as members of an organization associated with the system 100. As described further below, the organization can, in one example, be a financial institution. Developers of the financial institution can access the authoring module 202 to create micro front-end components for use in creating contextual interfaces associated with the applications provided by the financial institution to users.

In some examples, the authoring module 202 can be interactive in nature, allowing for automatic and semi-automatic (e.g., with user input) micro front-end generation. For instance, the authoring module 202 can provide wizards and pre-programmed functionality that allow for easy, semi-automatic generation of new micro front-end components.

In some examples, the authoring module 202 is programmed to assure that the micro front-end components meet conformance criteria associated with the hub device 110. Examples of such conformance criteria are described below.

Further, the authoring module 202 can be programmed to facilitate the reuse of resources as new micro front-end components are created. For instance, the authoring module 202 can be programmed to provide libraries of code that can be combined to provide desired functionality. Further, two or more existing micro front-end components can be combined in different manners to create a new micro front-end component with desired functionality. Many other configurations are possible. In some embodiments, authoring module 202 is further programmed to simplify micro front-end development and deployment by using APIs and/or database tables allowing for the automatic generation of, for example, an experience API or Graph Query Language endpoint.

The example hub and registry module 204 facilitates the registration of the micro front-end components with the hub device 110. Hub and registry module 204 may include sub-components, such as monitoring module 210, conformance module 212, and deployment module 214.

The monitoring module 210 monitors the conformance and state of stored, registered, and deployed micro front-ends. The monitoring module 210 tracks micro front-ends as they are moved and used throughout the system 100 and maintains an understanding of how the overall ecosystem of the system 100 and the user's contextual experience is behaving. Ecosystem behavior may include current activity and performance of micro front-ends deployed into an active user experience.

In some examples, the monitoring module 210 may calculate and provide analytics. Analytics may relate to a deployed micro front-ends, and characterize the performance of the micro front-end within the application or other user experience. For example, a micro front-end's response time may be monitored and tracked. Performance of a micro front-end deployed in more than one application or experience may be tracked and compared across the different deployment locations.

In embodiments, the monitoring module 210 may monitor an app or experience overall and evaluate the composite or collaborative performance of the one or more micro front-ends composing the experience.

Analytics may relate to a stored micro front-end that is not presently deployed and is passively presently in the hub.

In some examples, the monitoring module 210 provides a user interface. The user interface may display a "live" view of micro front-ends on the hub, such as registered micro front-ends presently available and/or a summary of micro front-end deployment. The user interface may display a dependency graph of relationships among micro front-ends, for example as a bubble graph. Data monitored by the monitoring module 210 and, in some embodiments, displayed on the user interface, may include the current version, the version history, deployment status, availability status, and conformance status.

In some examples, conformance status may include whether the micro front-end in conformant or nonconformant. In some examples, conformance status may indicate on a scale how close to conformance a micro front-end is and/or may include a conformance report summarizing conformance and nonconformance with individual rules. The conformance report may provide of summary of corrections required before conformance can be reached.

In some embodiments, the monitoring module 210 may interface with the authoring module 202 and monitor micro front-ends during building. The monitoring module 210 may promote communication between the authoring module 202 and the conformance module to support applying conformance criteria to micro front-ends during build time.

The monitoring module 210 may interface with the context configuration module 206 and the rendering module 208 to inform the building of the experience. For example, information on a micro front-end's performance or current status may implicate it's suitability for some experiences.

Conformance module 212 maintains and applies conformance criteria to micro front-ends received from authoring module 202 and stored in the hub. In one non-limiting example, the conformance module 212 of the hub and registry module 204 defines one or more API that allow new micro front-end components to be registered. In this example, the registration can be in the form of a domain specific language, such as a JavaScript Object Notation (JSON) contract, wherein the contract defines the conformance criteria required for each micro front-end component.

Contracts may establish, for example, that a micro front-end must implement a particular reload method, must generate a finished reloading event to other interested micro front-ends, must gather data, etc. A contract may establish a default placeholder user interface tile image, describe supported settings (e.g., a number of rows in a table a user can configure), etc. The language describing these and other contracts specific to the micro front-end ecosystem (domain) may be used to define metadata on the hub.

For instance, example conformance criteria can include one or more of technical, design, and/or performance attributes. Conformance can relate to how the micro front-end component will interact with standard capabilities defined for the system 100. These can be broadly categorized into "control", which is used to enforce the standard capabilities, and "data", which defines the behavior of the micro front-end component.

The micro front-end components can "plug" into the "control" part. For example, to adequately personalize an experience for individual users we need to respect: a) user role entitlements (e.g., can they see the micro front-end, invoke feature, limits, etc.); b) user preferences; c) artificial intelligence-derived presentment of the micro front ends components based on a variety of factors; d) active experimentation underway; e) historical behavior by the micro front-end or a user; and so on.

Micro front-end components can implement methods to support these and other capabilities including to exchange and respond to state transitions, gather analytical data, adjust form factors and displays, activity targeting requests, participate in experiments, feedback, deep linking, tracing, and so on.

For instance, the technical attributes can include requirements on how the micro front-end components are created, such as using specific programming languages, and risk aspects, such as how the micro front-end components address confidential information (e.g., encryption requirements). The design attributes can include requirements on the "look and feel" of the interface generated by the micro front-end components, such as particular fonts, colors, and/or other design aspects. The performance attributes can provide certain metrics on how the micro front-end components perform, such as requiring, for example, a certain rendering and processing speeds. In further examples, associated system entitlements, such as for authorization, can define what can be done by a user, and settings define how micro front-ends can be configured, such as defining available selections by the user (e.g., table rows to show). Many other configurations are possible.

In some examples, the server device 108 allows for the definitions of user profiles. The user profiles can define particular attributes of the user that facilitate the creation of the micro front-end components. For instance, the profile of the user can define bibliographic information about the user (e.g., location, age, etc.), the user's role (e.g., job position and family environments), and the user's preferences.

In some embodiments, conformance rules may embody business rules and relate to business domains. For example, conformance rules relates to relationship or interdependency between data handled by multiple micro front-ends.

Conformance may be an automated determination based upon a defined set of rules which are integral with the hub and registry module 204. In some embodiments, manual elements may be incorporated into the conformance determination. For example, a micro front-end may be updated to a new version, with the new version failing to satisfy the conformance criteria. User input may be prompted to revise the new version or approve a reversion to the prior version. In some embodiments, the conformance module 212 automatically reverts to the prior version and gives the user an opportunity to revise the new version. In some cases, a reversion to a prior version may be incompatible with other updates, such as system updates or updates to interdependent micro front-ends.

A micro front-end with no compatible version approved for registry may be automatically or manually disabled. In some examples, applications or experiences using the disabled micro front-end may also be disabled or reverted to a prior version of the micro front-end.

In embodiments, the conformance module 212 incorporates machine learning components. For example, the conformance module 212 may include a machine learning model and the conformance criteria may be defined by training the model to identify conforming and nonconforming micro front-ends. In embodiments, the machine learning model may be trained to predict imminent or otherwise potential future nonconformance, such as identifying that performance is slowing or may drop below conformance criteria.

In some examples, the model may be trained to output a report of conformance failures.

The conformance module 212 may generate a conformance report. The conformance report may indicate a status of conformant or nonconformant. The conformance report may indicate a location on a scale from conformant to nonconformant, indicating where on the scale a particular micro front-end falls in terms of conforming. The location may be determined, for example, as a percent calculation of the percent of conformance rules met. The conformance report may indicate a conformant or nonconformant status in relation to individual conformance rules. The conformance report may include a summary of corrections to be made to bring the micro front-end into conformance.

The deployment module 214 provides for distribution and coordination of micro front-ends within a user's contextual experience. Micro front-ends may be deployed from the hub and registry module 204 by the deployment module 214 into one or more user contextual experiences. Micro front-ends may be deployed singly or in groups of two or more. A particular micro front-end may be deployed to one or more applications or user experiences, with the deployment module 214 ensuring duplicate or redundant micro front-ends are not deployed to a same application or experience. Coordinated deployment of interdependent micro front-ends, such as one micro front-end that depends upon another micro front-end or two or more micro front-ends that each depend upon each other, may be managed by the deployment module 214.

Once the micro front-end components are created using the authoring module 202 and registered by the hub and registry module 204, the micro front-end components are ready to be used to create the contextual interfaces. When doing so, additional contextual information can be provided to the micro front-end components as the components are assembled for display to users.

The example context configuration module 206 is programmed to provide the additional contextual information to the micro front-end components as the components are assembled to be surfaced on a contextual interface. The contextual information is used to drive the selection of a set of micro front-ends that are composed to yield the user experience at that moment, along with data that is available to the selected set of micro front-ends. In some examples, the deployment module 214 generates a most relevant experience for the user based on the contextual information. Once the experience is generated by the deployment module 214, the set of micro front-ends is deployed and rendered into the experience by the rendering module 208, discussed in more detail below.

For example, a unified login micro front-end may be composed that is able to leverage contextual information such as a user-id, a user device, and a user location, each of which drives an entirely differentiated experience selecting from a variety of external or internal applications for the user using the same micro front-end.

Generally, the contextual information can include data associated with the user so that the micro front-end components are assembled in a more efficient manner. This contextual information can include, without limitation, operational information and personal information, as described further below.

For instance, the system 100 can also include a reusable information device 102 and a user information device 106 that provide additional contextual information for the system 100 as the contextual interface is generated for the user.

In this example, the reusable information device 102 is programmed to enhance efficiency in the development and deployment of the micro front-end components. More specifically, the reusable information device 102 can monitor the functionality of existing micro front-end components and suggest the reuse of those micro front-end components when new functionality is being developed.

For instance, in the example with the financial institution, each line of business can define certain aggregated experiences associated with the functionality provided for users. The reusable information device 102 can suggest existing micro front-end components from the hub device 110 which can provide some or all the desired functionalities.

For example, assume a line of business is developing a user experience associated with payment of a mortgage. A different line of business may have already developed one or more micro front-end components used for payment of an automobile loan. One or more of these micro front-end components could be identified by the reusable information device 102 and used to develop the user experience associated with payments for the mortgage. Many other examples exist.

One non-limiting example of defining functionality and development according to user interactions in order to enhance the efficiencies of developing and providing products and services is described in U.S. patent application Ser. No. 17/658,015 filed on Apr. 5, 2022, the entirety of which is hereby incorporated by reference.

The example user information device 106 is programmed to provide additional information that may be unique to the user. For instance, with the example involving the financial institution, the user information device 106 can access additional details about the user, such as user preferences and user financial information, such as financial products and account balances. This information can be provided from the user information device 106 to the context configuration module 206 when selecting the micro front-end components for the contextual interface, as described further below.

In addition to accessing information from the reusable information device 102 and the user information device 106, the example context configuration module 206 can also be context-aware and use machine learning to further enhance the use of the micro front-end components to generate the contextual interfaces.

For instance, the context configuration module 206 can use machine learning to understand user context. This can include prior and/or current activity associated with the system 100. For instance, a user context can be generated by the context configuration module 206 based upon what the user is currently doing. For instance, if the user is currently filling out a form on the system 100, the context configuration module 206 can access information from the user information device 106 and present micro front-end components to facilitate entry on the form, such as being pre-filled with necessary information.

Further, the context configuration module 206 can use machine learning to understand user preferences and provide that context to the rendering module 208. For instance, the context configuration module 206 can be programmed to learn about user, such as what the user wants to see, where, how, etc. For example, if the user continues to use certain functionality associated with certain micro front-end components and consistently cancels, hides, or otherwise removes other functionality, the context configuration module 206 can be programmed to use machine learning to understand those user preferences. The context configuration module 206 can provide information to the rendering module 208 to surface those micro front-end components that are more useful to the user and hide or otherwise suppress those that are not. Additional examples are provided below.

Further, the context configuration module 206 can determine preferences for the type of platforms used by the user. For instance, if the user prefers to access the system 100 via a mobile device, the context configuration module 206 can optimize the micro front-end components for mobile access. This can include changing functionality and user interface components to optimize access on a smaller screen and with different input types (e.g., touch).

In addition, the context configuration module 206 can be programmed to experiment to better understand preferences associated with individual users, groups of users, or an entire population of users. For instance, if a group of users, such as those over a certain age or having other common attributes, appears to struggle with functionality, the context configuration module 206 can be programmed to modify or suggest different micro front-end components with different functionality to address those shortcomings.

To accomplish this learning, the context configuration module 206 can experiment by suggesting different functionality and/or micro front-end components for different groups of users and determining which functionality and/or micro front-end components are preferred for particular users, groups of user, etc. Examples of such criteria for grouping of users includes: user role; preferences or likes; bibliographic commonality (e.g., age, gender, location, etc.), time of day, etc.

For instance, in one example, assume that a user accesses the system 100 every Friday afternoon to make a certain payment. Over time, the context configuration module 206 can use machine learning to identify such a trend. When the user accesses the system 100 on Friday afternoons, the context configuration module 206 can suggest the micro front-end components that facilitate the payment be surfaced by the rendering module 208 at a convenient location for the user so the user can efficiently make the payment. Many other configurations are possible.

One example of a system for providing a customized user experience is described in U.S. patent application Ser. No. 18/174,054 filed on Feb. 24, 2023 and claiming the benefit of U.S. Provisional Application No. 63/268,935 filed on Mar. 7, 2022, the entirety of which is hereby incorporated by reference.

The example rendering module 208 is programmed to access one or more of the micro front-end components from the hub device 110 to generate the contextual interface for the user. The contextual information is used to drive the selection of a set of micro front-ends that are composed to yield the user experience at that moment, along with data that is available to the selected set of micro front-ends. In some examples, the deployment module 214 composes a set of micro front-ends to generate a most relevant experience for the user based on the contextual information and communicates the experience to the rendering module 208. As noted, the rendering module 208 may also receive input directly from the context configuration module 206 when generating the contextual interface. Once the experience is generated, the set of micro front-ends is deployed and rendered into the experience by the rendering module 208.

For instance, when a user accesses the system 100, the context configuration module 206 and/or the rendering module 208 access the relevant micro front-end components from the hub and registry module 204, and the rendering module 208 generates the contextual interface. This interface can then be displayed by a client device for the user, such as the client device 104.

In some examples, the rendering module 208 is programmed to use the information from the context configuration module 206 so that the contextual interface is specific to the user or group of users. In this manner, the contextual interface can provide greater efficiencies in information and functionality for the user.

In some examples, the micro front-end components are used by the rendering module 208 to generate various aspects of the contextual interface. Examples of such aspects in the context of the financial institution example include one or more of:
(1) header—navigation header functionality is made contextual using micro front-end components;
(2) payments—functionality associated with wire payments is made contextual using micro front-end components; and
(3) consolidated view of account balances—functionality associated with the display of accounts is made contextual using micro front-end components.

This is a non-exhaustive list of the many aspects of the contextual interface that can be generated by the rendering module 208 using the micro front-end components.

In some examples, the rendering module 208 is programmed to change how the contextual interface is generated over time. For instance, the rendering module 208 can initially generate an interface that is standard across all users, groups of users, etc. Over time, the rendering module 208 can receive additional information about the user from the context configuration module 206. Once sufficient context is developed, the rendering module 208 can be programmed to use the micro front-end components to generate the contextual interface for the user, thereby providing a customized, personalized interface. As noted herein, rendering by the rendering module 208 can be related to a variety of factors, and different users can get custom, personalized and contextual experiences based on those factors and their persona over time.

Further, as noted, the rendering module 208 can be programmed to experiment over time by generating different contextual interfaces for users to determine preferences, efficiencies, etc. This can assist the context configuration module 206 and the rendering module 208 in determining which contextual interface may be optimized for a particular user or group of users based upon machine learning.

Finally, the rendering module 208 can be programmed to make these changes automatically, such as by using machine learning. Further, the rendering module 208 can be programmed to allow the changes to be made manually by the user and/or developer. For instance, the system 100 can provide preferences that allow the user to select between a standard interface and the contextual interface, as desired. Many other configurations are possible.

Figure 3:
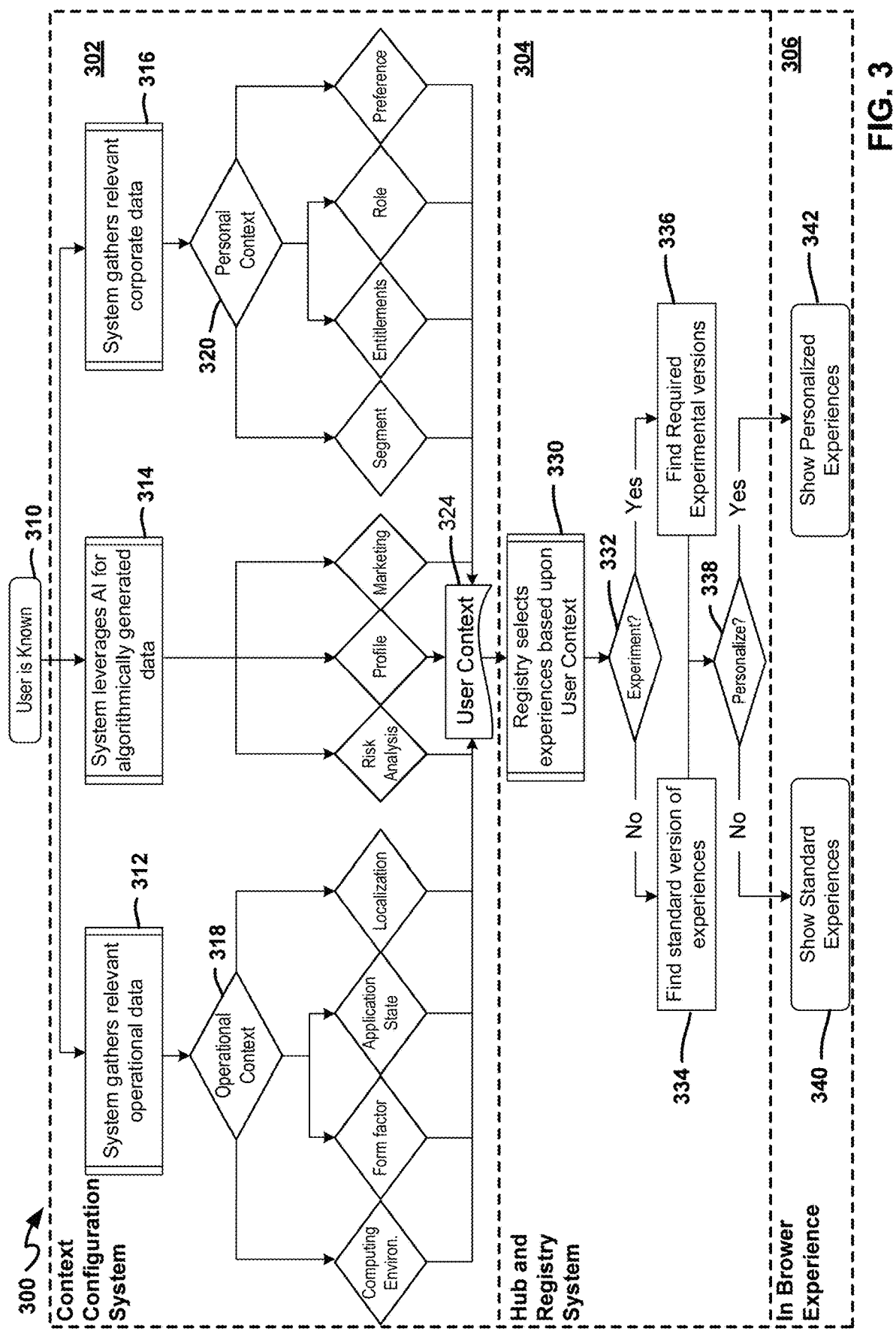
FIG. 3 shows an example method for generating a contextual interface for a user from the micro front-end hub of FIG. 1.

Referring now to FIG. 3, an example method 300 for generating the contextual interface for the user by the system 100 is shown. The example method 300 includes context configuration operations 302, hub and registry operations 304, and rendering operations 306.

In this example, the user is authenticated at operation 310. However, in other instances, the user need not be authenticated or otherwise known to generate the contextual interface.

Next, at operations 312 and 316, relevant data needed to generate the contextual interface is accessed. As noted, this relevant data can include information known about the user. The data can also include machine learning associated with the user or group of users, such as user preferences, etc.

Next, at operations 318 and 320, the information about the user is used to determine both the operational information and the personal information. As noted, these aspects are used to determine the context associated with the user so the contextual interface can be generated.

In this example, at operation 318, such information as the user's computing environment, form factor for the user' computing device, application state on the computing device, and localization based upon location can be used as operational information. Likewise, information such as the user's segment or grouping, entitlements associated with the user's stature, role, and preferences can be used as personal information.

At operation 314, the system 100 can use artificial intelligence to generate further information associated with the user. This information can relate to risks associated with the user, a profile generated for the user, and/or marketing information associated with the user, such as what products or services may be of most use to the user.

Next, at operation 324, the operational and personal information and the information generating using artificial intelligence are combined to generate the contextual information associated with the user. As described further above, this contextual information is used to select the micro front-end components that are used to create the contextual interface for the user.

Next, at operation 330, the relevant micro front-end components are selected from the hub.

At operation 332, a determination is made by the system as to whether experimentation is being conducted. If so, control is passed to operation 336, and experimental aspects of the micro front-end components can be selected. If not, control is instead passed to operation 334, and standard version of the micro front-end components are selected. As noted, the experimentation can be used to determine preferences for the specific user and/or preferences for a group of users or globally for all users.

Finally, at operation 338, the system 100 determines whether to provide the contextual interface to the user. If so, control is passed to operation 342, and the contextual interface is rendered. If not, control is passed to operation 340, and a standard interface is instead rendered. As noted, the decision whether to show the contextual interface can be automated, such as by the system 100 determining if enough contextual information is known for the user. Or, the decision can be manual, such as by allowing the user to decide whether to have the contextual or standard interface shown. Many configurations are possible.

Figure 4:
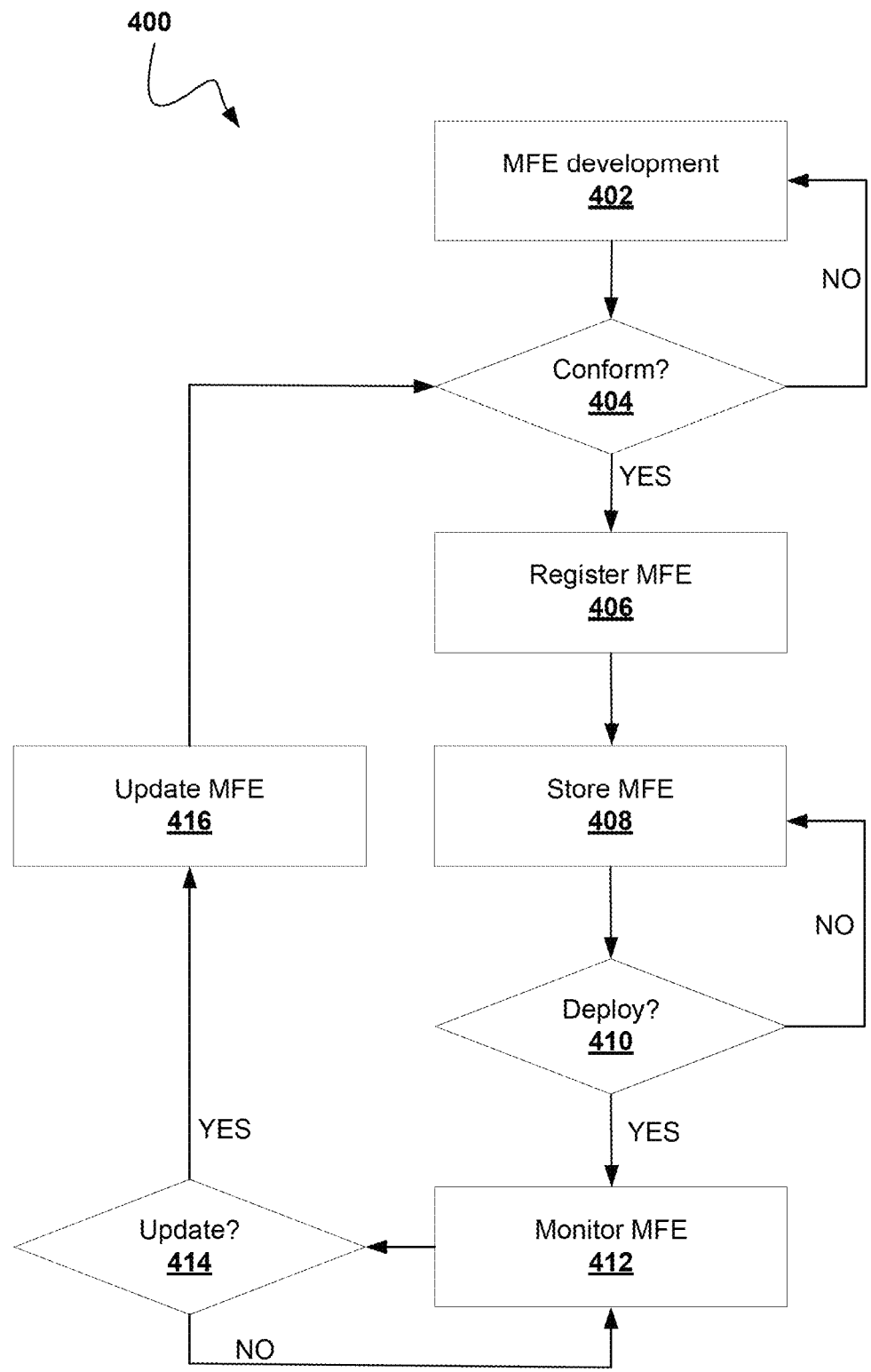
FIG. 4 shows an example method for registration and deployment of a micro front-end from the micro front-end hub of FIG. 1.

Referring now to FIG. 4, an example method 400 of registering and deploying micro front-ends in a contextual experience by the system 100 is shown.

At operation 402, a micro front-end is received at the hub, such as hub and registry module 204 of FIG. 2. The micro front-end may be a new micro front-end or a new version of an existing micro front-end. In some example, the micro front-end may be duplicative or redundant with a micro front-end already registered.

The micro front-end may be received from another component of the contextual experience system, such as an authoring module. In some instances, micro front-end development may be incorporated within the hub At operation 404, the received micro front-end is checked for conformity with experience rules. In some embodiments, experience rules are defined using a domain specific language associated with the hub. Experience rules may define features and function a micro front-end must include to be registered and stored within the hub. For example, experience rules may be recorded as contracts written, using JSON notation, in a language specific to the micro front-end ecosystem. For example, the hub may incorporate domain specific language which requires a micro front-end to include the ability to accept a request to reload before the micro front-end is accepted and registered by the hub. Other non-limiting examples of experience rules which micro front-ends may be required to conform to include a requirement the micro front-end be able to indicate when loading is complete, a requirement the micro front-end be able to collect user data and, in some examples, a further requirement that the micro front-end does collect the user data, and a requirement the micro front-end respond within a certain amount of time to a request and, in some examples, a further requirement that different requests have different response time requirements.

If the micro front-end is determined to not be in conformance, the micro front-end may be returned to development, such as at operation 402. If the micro front-end is determined to be in conformance, the micro front-end is registered, as at operation 406.

At operation 408, the registered micro front-end is stored at or by the hub.

At operation 410, the micro front-end may be deployed, such as by being composed into an application or other contextual user experience. If a micro front-end is not suited or selected for deployment in a particular application or experience, it may be returned or maintained in storage. If a micro front-end is selected for composition into an application or experience, the hub may continue to monitor the deployed micro front-end, as at operation 412.

In some embodiments, the method 400 is iterative. At operation 414, a determination is made whether to update the micro front-end. The update determination may be made periodically or in response to a state observed during monitoring the micro front-end, as at operation 412.

If the determination is made, at operation 414, to not update the micro front-end, monitoring of the micro front-end may resume, as at operation 412.

If the determination is made, at operation 414, to update the micro front-end, the update may be performed, as at operation 416. Once the update is completed, the micro front-end's conformance may be confirmed, as at operation 404. In some embodiments, conformance is built into the micro front-end through the iterative update process, by leveraging, for example, code generation, automated testing during builds, common software development kits, etc.

Referring now collectively to FIGS. 5-9, example user interfaces 500, 600 for viewing and/or interacting with activity within the hub are shown. Example user interfaces 500, 600 provide data related to and may be generated by hub device 110 of FIG. 1, such as by hub and registry module 204 of FIG. 2.

In some examples, credentialed administrators access and manage the micro front-end ecosystem from the hub user interface. The hub, and the associated user interface, may function as a control center of the entire micro front-end ecosystem. For example, a credentialed administrator may adjust the status of a particular version of micro front-end, may monitor and/or restrict micro front-end usage, update rules and metadata for micro front-ends, etc.

FIG. 5 shows an example user interface 500 depicting conformance checks performed by the micro front-end hub. User interface 500 depicts one example of a conformance report 502. The conformance report 502 shows a conformance status 504 for each of a plurality of rules 506. By providing an individual conformance status 504 for each rule 506, the conformance report 502 provides one example of a summary of corrections to made to bring a micro front-end into compliance.

In some embodiments, user interface 500 incorporates interactive components reflected the control and management features of the hub. For example, a credentialed administrator may revert or update a version of a micro front-end from the interface, may get runtime metrics reflecting how the micro front-end is used within the ecosystem and experiences, may take a micro front-end out of service, may add restrictions for the use of a micro front-end, etc. from the hub by interacting with components of the interface 500.

Figure 6:
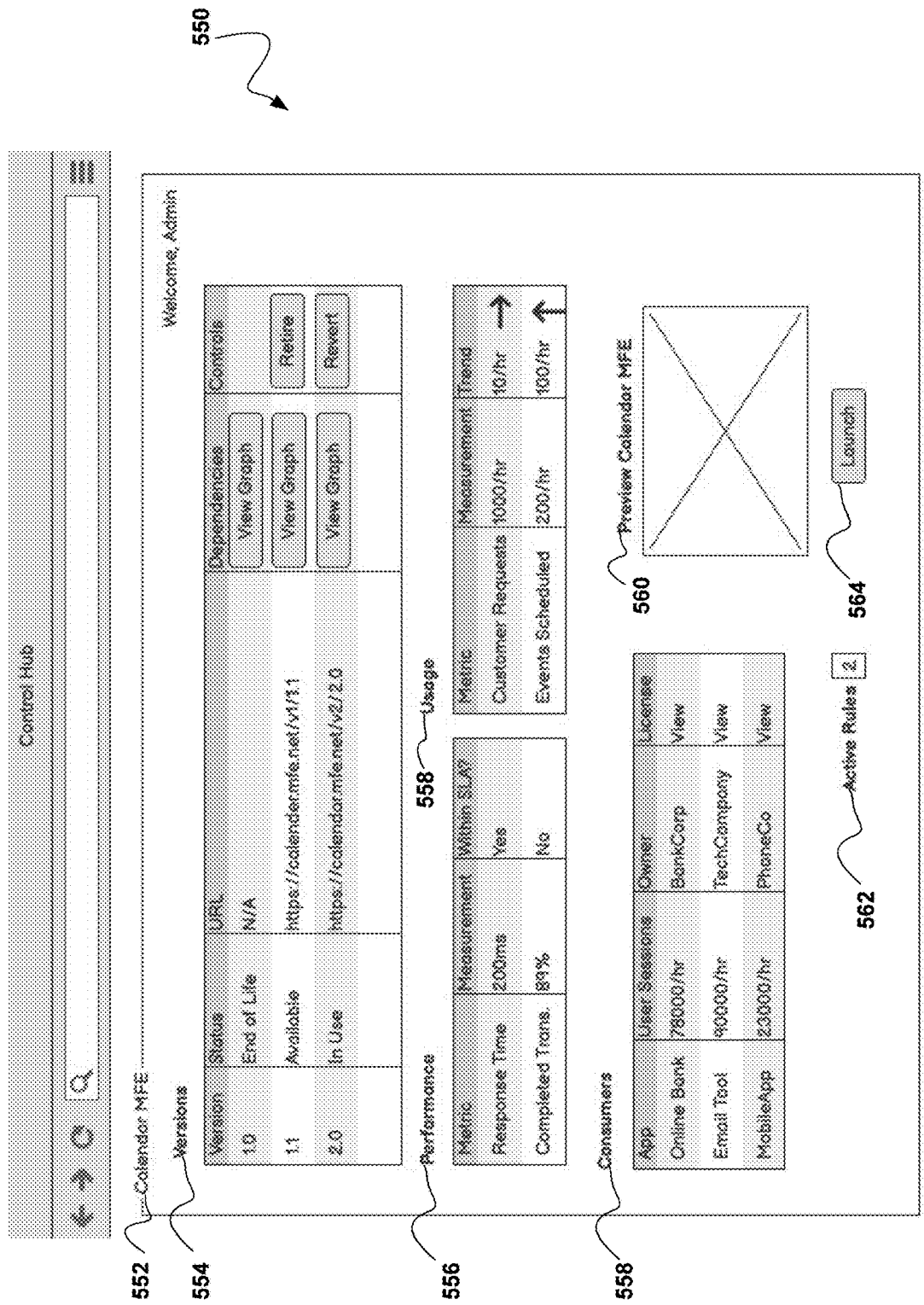
FIG. 6 shows an example user interface for performing administrative operations within the micro front-end hub of FIG. 1.

FIG. 6 shows an example user interface 550 for performing administrative operations within the micro front-end hub of FIG. 1. Admin user interface 550 may provide additional functionality and information about micro front-ends. Admin user interface 550 includes title 552, version status 554, performance data 556, usage data 558, preview 560, rules data 562, and launch function 564.

Title 552 identifies the particular micro front-end being accessed. Version status 554 identifies available and, in embodiments, historic versions of the micro front-end in the hub. Individual versions are identified, such as through numbering, along with a status of each version and an access or storage location. Version status 554 may include a dependency graph for each version. An example dependency graph is shown and discussed in more detail below in respect to FIG. 7. Controls may be provided for each version, including, for example, control options to retire out-of-use but available versions and control options to revert an in-use version to another out-of-use version.

Performance data 556 provides measurement of one or more performance metrics. Monitored metrics may be identified by a category or metric title along with an associated measurements. Monitored metrics may include response time and percent of transactions completed, shown in the example of FIG. 6. Other, non-limiting, examples not shown include rendering speed and processing speed. Performance data 556, in embodiments, may include a indication of whether a present measurement of a metric fall within predetermined standards, e.g., within a service level agreement (SLA).

Usage data 558 provides measurement of one or more usage metrics. Monitored metrics may be identified by a category or metric title along with an associated measurements. Monitored metrics may include a number of customer requests or a number of schedule events.

In embodiments, usage metrics may be further defined by a time parameter. For example, usage measurements may be reported as per minute, per hour, per day, etc. In embodiments, usage metrics may further include a trend indicator, identifying whether measurements are trending upward, downward, steady, etc. The trend indicator may include a numerical and/or time-based indicator of change. The trend indicator may include a graphic or symbolic indicator of change.

In some embodiments, usage data 558 includes tracking of where or by whom usage of a particular micro front-end occurs. In embodiments, usage data 558 related to where in the micro front-end is being consumed may be referred to as consumer data and may be presented separately from usage data related to overall consumption of the micro front-end. Usage data 558 may include fields for identifying applications in which the micro front-end is incorporated and may include a measure of a number of sessions in which the application called the micro front-end. Usage data 558 may further indicator an owner of the application and identify the owner's license to use the particular micro front-end.

Preview 560 provides a view of the micro front-end version currently active that an administrator can view while making adjustments from the user interface 550. Rules data 562 provides an indication of active rules applicable to the micro front-end version currently in use. Launch function 564 enables an administrator to deploy changes made in the admin user interface 550 to the in use version of the micro front-end. Interface 550 may further include additional functionality, such as back, forward, reload, and home buttons, a search bar, and/or a menu tab or pop-out.

Figure 7:
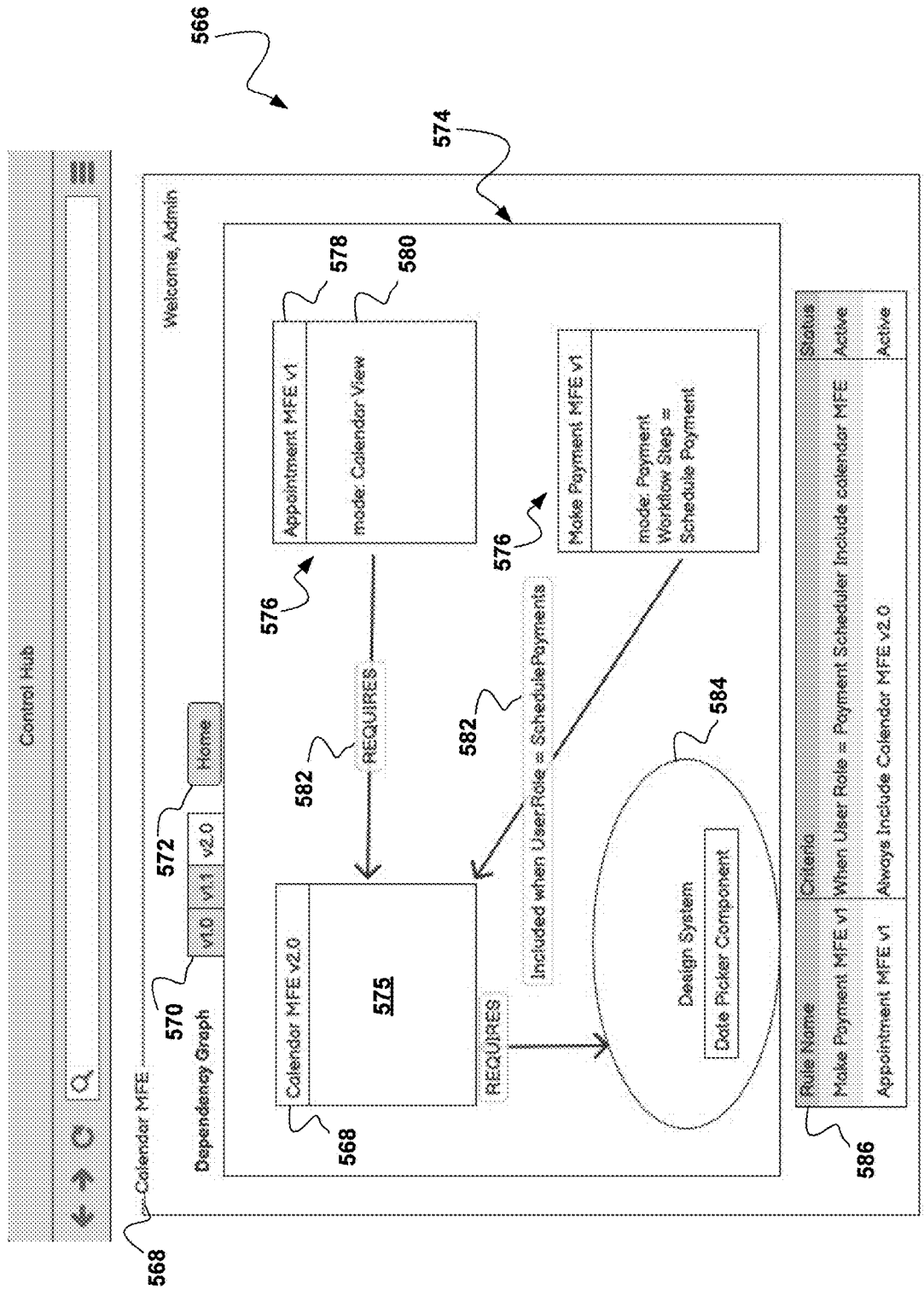
FIG. 7 shows an example user interface depicting a dependency graph for a micro front-end within the micro front-end hub of FIG. 1.

FIG. 7 shows an example user interface 566 a dependency graph for a micro front-end within the micro front-end hub of FIG. 1. User interface 566 is accessed, for example, by selecting to view a dependency graph from the versions data 554 of the admin user interface 550 of FIG. 6. User interface 566 includes title 568, version tabs 570, return function 572, graph 574, and related rules data 586. Graph 574 includes title 568 indicating the instant micro front-end, one or more related micro front-ends 576, relationship labels 582, and, in some embodiments, other related components 584. Each related micro front-end 576 includes a identifying title 578 and a relationship body 580.

Title 568 identifies the micro front-end to which the dependency graph being viewed relates. Version tabs 570 enable a user to navigate among dependency graphs relates to one or more versions of the a particular micro front-end. In some cases the dependency of a micro front-end may change between versions, changes which a user may view by using version tabs 570 to navigate among dependency graphs of the different version. Return function 572 enables a user to navigate back to an admin user interface, such as user interface 550 of FIG. 6.

Graph 574 provides a graphical view of relationships between a subject micro front-end 575, identified by title 568, one or more related micro front-ends 576, and, in some cases, other related components or systems 584. Title 568 identifies the subject micro front-end 575 and may include additional information about the subject micro front-end 575, such as identifying the version of the subject microfront end to which the graph 574 being viewed relates. In some embodiments, the relevant version of the subject micro front-end 575 may be identified by version tabs 570.

Related micro front-ends 576 are micro front-ends associated with rules establishing dependency on and/or from the subject micro front-end 575. In embodiments, each related micro front-end 576 includes a identifying title 578 and a relationship body 580. Identifying title 578 provides identifying information enabling related micro front-end 576 to be traced through other interfaces of the hub and system. In some implementations, identifying title 578 may include relevant version information. Relationship body 580 may include criteria associated with the rule establishing the relationship with the subject micro front-end 575.

In the example shown in FIG. 7, both related micro front-ends 576 depend upon subject micro front-end 575, as reflected by relationship labels 582. In this example, each relationship label 582 include an arrow indicating the direction of dependency and text identifying the nature of the dependency. For example, in one case, the related micro front-end 576 constitutively requires the subject micro front-end 575 and, in another case, the related micro front-end depends upon the subject micro front-end 575 when specific criteria is met. This criteria may be reflected in relationship body 580 and/or relationship label 582. The subject micro front-end 575 in turn relies upon another related component 584, as can be seen from the direction of the arrow and the text of relationship label 582.

Related rules data 586 provides a display of rules establishing relationship between the related micro front-ends 576 and the micro front-end to which the graph 574 relates. In some cases, each relationship label 582 is defined by a rule shown in the related rules data 586. Related rules data 586 may include fields identifying rules by name and/or version, identifying criteria associated with the rules, and identifying a status, e.g., active/inactive, for each rule. Interface 575 may further include additional functionality, such as back, forward, reload, and home buttons, a search bar, and/or a menu tab or pop-out.

Figure 8:
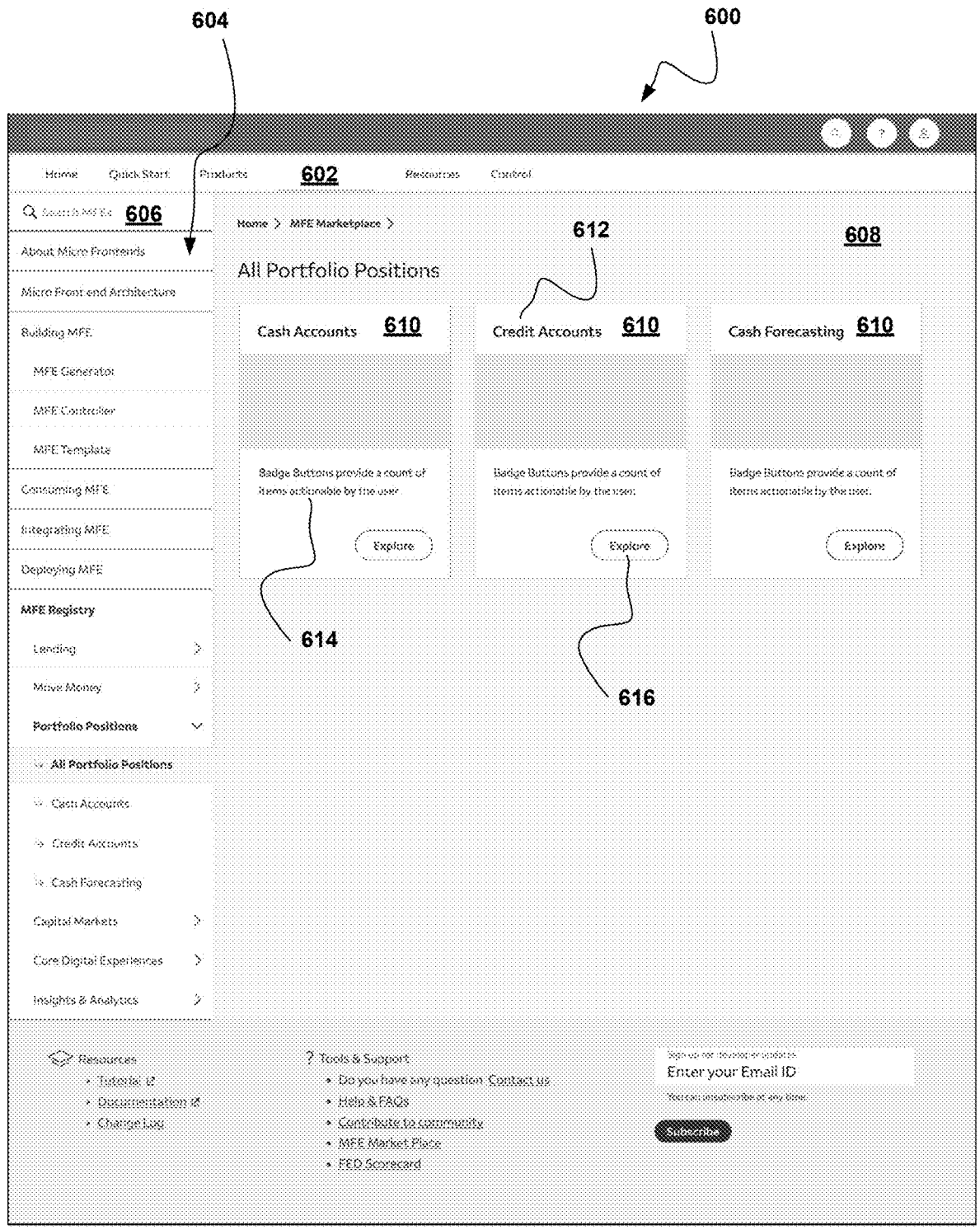
FIG. 8 shows an example user interface depicting an overview of micro front-ends stored in the micro front-end hub of FIG. 1.

FIG. 8 shows an example user interface 600 depicting an overview 602 of micro front-ends stored in the micro front-end hub. Example overview 602 provides a summary 604 of registered micro front-ends available in the hub. Example summary 604 is presented as a categorical list view, with each category containing a drop of includes micro front-ends. Other organization structures are envisioned. Other features, such as search feature 606, may assist a user in navigating registered micro front-ends.

An explorer space 608 provides screen space on the user interface 600 to explore available micro front-ends. Example explorer space 608 displays individual micro front-ends as tiles 610. Each tile 610 includes an individual identifier for the specific micro front-end, such as a title 612 or a descriptor. Individual identifiers may also include non-descriptive names or numbers. Each tile 610 may also include a summary 614 or other indicator a function provided by the micro front-end. Each tile 610 may also include button 616 or other means of linking or navigating to a more complete report of the micro front-ends functions and status.

FIG. 9 shows an example user interface 650 depicting a report 652 on a micro front-end. Report 652 may be reached, for example, by following the button 616 or link on a dedicated tile 610 for the particular micro front-end on the hub overview 602 of FIG. 8. Report 652 may repeat title 612 and summary 614 of tile 610 from the hub overview 602 for consistency and confirmation of having navigated to the desired report. Report 652 includes a demo 654 demonstrating operation of the micro front-ends according to current configuration parameters.

A specifications section 656 provides information related to authoring of the micro front-end. In some embodiment, the specifications section 656 may provide a link to a conformance report associated with the micro front-end, such as conformance report 502 of FIG. 5. A details section 658 may specifically include details related to the micro front-end within the hub. For example, a status bar 660 may indicate the current status of the micro front-end from the perspective of the hub. A configuration section 662 may include information specific to the micro front-end's composition into applications and user experiences, including requirement the micro front-end may have to operate within an experience. A usage and analytics section 664 may include information related to the micro front-ends performance in deployment and operation.

Other information, not shown in the example of FIG. 9, related to the micro front-end may be included in the report 652. In some embodiments, particular rules associated with the micro front-end may be included. For example, a particular micro front-end may be restricted from certain users or experiences. The report 652 may reflect such a rule, for example in details section 658. The rule may establish particular users or experiences in which in the micro front-end may be implemented or from which the micro front-end is excluded. In some embodiments, accessibilities and restrictions may also be adjusted, by a credentialed administrator, from within the report 652, such as to add or change access grants or restrictions.

In examples directed to a micro front-end which is dependent upon or depended upon by another micro front-end, the dependencies may be included in the report 652. For example, a report for micro front-end A, which is dependent upon micro front-end B, may include a rule indicating such a dependency, such as within details section 658 or configurations section 662. The rule may establish the direction of dependency, showing micro front-end A cannot be deployed without micro front-end B. Likewise, another report for micro front-end B may include a rule indicating that micro front-end A depends upon micro front-end B. The rule may further provide indication that deployment of micro front-end B enables the deployment of other micro front-ends, e.g., micro front-end A.

The rule may reflect shared requirements between interdependent micro front-ends. For example, because micro front-end A is dependent upon micro front-end B, micro front-ends A and B may be required to be version aligned. The report for each of micro front-end A and B may indicate their current version and whether that version aligns with the interdependent micro front-end's version. As another example, a particular micro front-end, micro front-end C, may be configured with a rule that requires another micro front-end, micro front-end D, to be shown when micro front-end C is shown within a user experience. The requirement to show micro front-end D may be reflected in micro front-end C's report, such as in the specifications section 656 or the configurations section 662.

Figure 10:
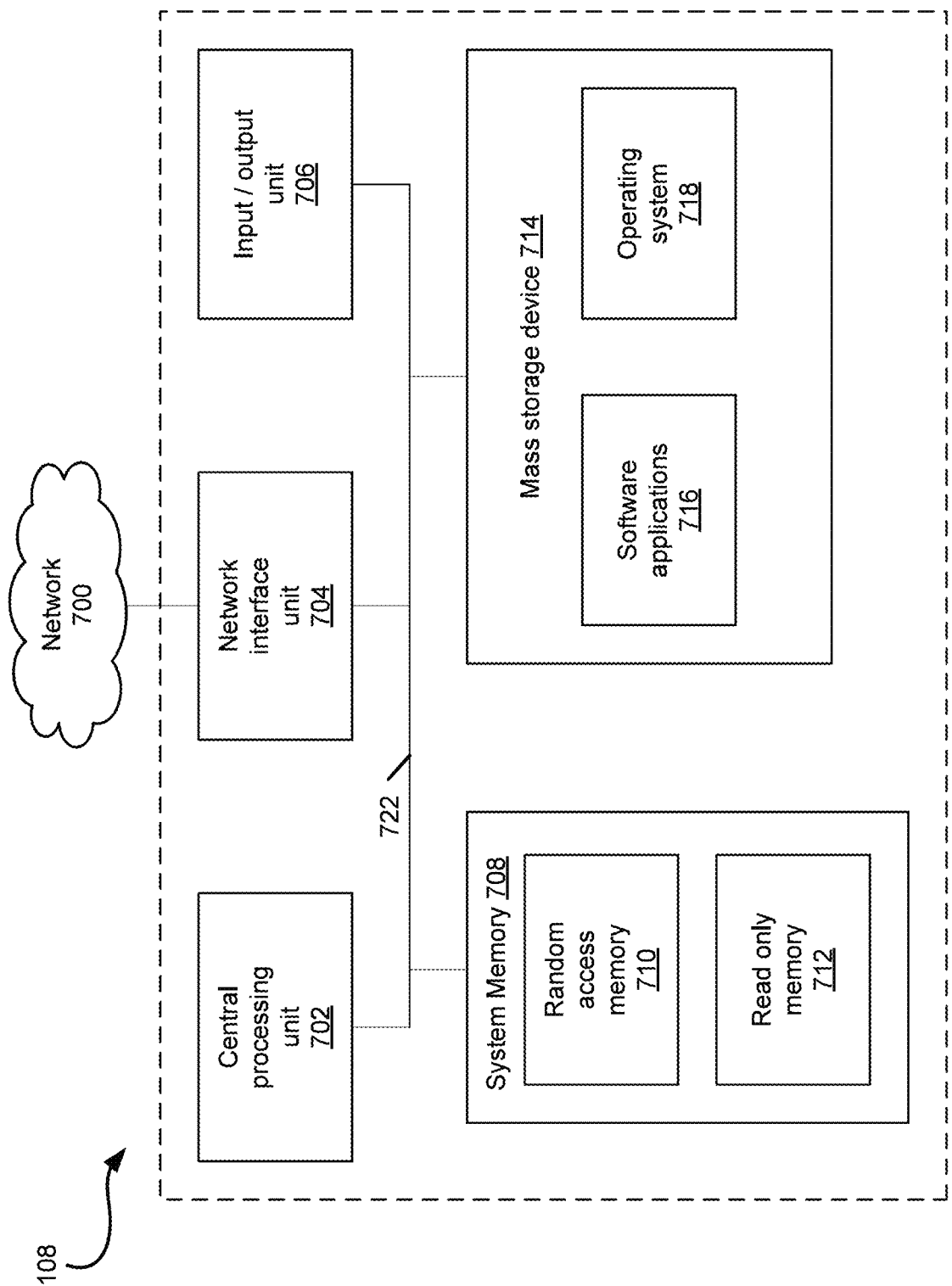
FIG. 10 shows example components of the server of FIG. 2.

FIG. 10 schematically shows example physical components of portions of the system 100 of FIG. 1. In particular, additional components of the server device 108 are illustrated. In this example, the server device 108 provides the computing resources to perform the functionality associated with the system 100. The other computing devices associated with the system 100, such as the client device 104, can be similarly configured.

The server device 108 can be an internally controlled and managed device (or multiple devices) of the business enterprise, e.g., the financial institution. Alternatively, the server device 108 can represent one or more devices operating in a shared computing system external to the enterprise or institution, such as a cloud. Via a network 700, the components of the system 100 that are physically remote from one another can interact with one another.

The server device 108 includes a central processing unit or processor 702, a system memory 708, and a system bus 722 that couples the system memory 708 to the processor 702.

The system memory 708 includes a random access memory ("RAM") 710 and a read-only memory ("ROM") 712. A basic input/output system that contains the basic routines that help to transfer information between elements within the server device 108, such as during startup, is stored in the ROM 712.

The server device 108 further includes a mass storage device 714. The mass storage device 714 is able to store software instructions and data.

The mass storage device 714 is connected to the processor 702 through a mass storage controller (not shown) connected to the system bus 722. The mass storage device 714 and its associated computer-readable data storage media provide non-volatile, non-transitory storage for the server device 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 108.

According to various embodiments of the invention, the server device 108 may operate in a networked environment using logical connections to remote network devices through the network 700, such as a wireless network, the Internet, or another type of network. The server device 108 may connect to the network 700 through a network interface unit 704 connected to the system bus 722. It should be appreciated that the network interface unit 704 may also be utilized to connect to other types of networks and remote computing systems. The server device 108 also includes an input/output unit 706 for receiving and processing input from a number of other devices, including a touch user interface display screen, an audio input device, or another type of input device. Similarly, the input/output unit 706 may provide output to a touch user interface display screen or other type of output device.

As mentioned briefly above, the mass storage device 714 and/or the RAM 710 of the server device 108 can store software instructions and data. The software instructions include an operating system 718 suitable for controlling the operation of the server device 108. The mass storage device 714 and/or the RAM 210 also store software instructions and applications 716, that when executed by the processor 702, cause the server device 108 to provide the functionality described above.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system, comprising:
   at least one processor; and
   non-transitory computer-readable storage storing instructions that, when executed by the at least one processor, cause the system to:
   generate a hub and registry module programmed to:
   determine if a plurality of micro front-ends is conformant with one or more experience rules, including indicating where a given micro front-end of the plurality of micro front-ends is located on a percentage scale from conformant to nonconformant, wherein the one or more experience rules define features and functions the given micro front-end must include to be conformant;
   register one or more of the plurality of micro front-ends in response to determining the one or more of the plurality of micro front-ends are conformant with the one or more experience rules;
   compose the one or more of the plurality of micro front-ends into an experience for a user;
   monitor performance of the one or more of the plurality of micro front-ends within the experience, wherein the performance includes a response time for the one or more of the plurality of micro front-ends;
determine the response time for the one or more of the plurality of micro front-ends does not meet the one or more experience rules;
responsive to a determination that the response time for the one or more of the plurality of micro front-ends does not meet the one or more experience rules, update the one or more of the plurality of micro front-ends;
determine an updated version of the one or more of the plurality of micro front-ends fails to satisfy the one or more experience rules; and
responsive to a determination the updated version of the one or more of the plurality of micro front-ends fails to satisfy the one or more experience rules, revert the updated version of the one or more of the plurality of micro front-ends to a prior version of the one or more of the plurality of micro front-ends.

2. The system of claim 1, wherein the hub and registry module is further programmed to:
determine a new version of the given micro front-end of the plurality of micro front-ends is conformant with the one or more experience rules;
store the new version of the micro front-end; and
replace a prior version of the micro front-end in the experience with the new version of the micro front-end.

3. The system of claim 1, wherein the one or more experience rules are defined using a domain specific language.

4. The system of claim 3, wherein the domain specific language is JavaScript Object Notation.

5. The system of claim 1, wherein the hub and registry module is further programmed to generate a user interface on a display, the user interface comprising an overview of the plurality of micro front-ends.

6. The system of claim 5, wherein the user interface comprises, for the given micro front-end, one or more of a current version, a version history, a deployment status, an availability status, and a conformance status.

7. The system of claim 6, wherein the conformance status indicates one of a conformant status or a nonconformant status.

8. The system of claim 6, wherein the conformance status comprises a report summarizing conformance and nonconformance with each of the one or more experience rules.

9. The system of claim 5, wherein the user interface comprises a dependency graph.

10. A method for managing a contextual micro front-end experience, the method comprising:
receiving a micro front-end;
determining the micro front-end conforms with one or more experience rules;
registering the micro front-end;
storing the micro front-end;
deploying the micro front-end in response to a request to compose a contextual user experience;
monitoring performance of the micro front-end within the contextual user experience, wherein the performance includes a response time for the micro front-end;
determining the response time for the micro front-end does not meet the one or more experience rules;
responsive to a determination the response time for the micro front-end does not meet the one or more experience rules, updating the micro front-end;
determining an updated version of the micro front-ends fails to satisfy the one or more experience rules; and
responsive to determining the updated version of the micro front-ends fails to satisfy the one or more experience rules, revert the updated version of the micro front-ends to a prior version.

11. The method of claim 10, further comprising determining a new version of the micro front-end is conformant with the one or more experience rules.

12. The method of claim 11, further comprising storing the new version of the micro front-end.

13. The method of claim 12, further comprising replacing a prior version of the micro front-end with the new version of the micro front-end.

14. The method of claim 12, further comprising maintaining a prior version of the micro front-end along with the new version of the micro front-end.

15. The method of claim 11, further comprising replacing a prior version of the micro front-end in an experience with the new version of the micro front-end.

16. The method of claim 15, further comprising making a second determination the new version of the micro front-end is incompatible with the experience.

17. The method of claim 16, further comprising generating a report summarizing the determination the new version of the micro front-end is incompatible with the experience.

* * * * *